United States Patent
Park et al.

(10) Patent No.: US 10,659,521 B2
(45) Date of Patent: May 19, 2020

(54) APPARATUS FOR TRANSMITTING BROADCAST SIGNALS, APPARATUS FOR RECEIVING BROADCAST SIGNALS, METHOD OF TRANSMITTING BROADCAST SIGNALS AND METHOD OF RECEIVING BROADCAST SIGNALS

(71) Applicant: LG ELECTRONICS INC., Seoul (KR)

(72) Inventors: Somi Park, Seoul (KR); Minsung Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 359 days.

(21) Appl. No.: 15/821,033

(22) Filed: Nov. 22, 2017

(65) Prior Publication Data
US 2018/0262552 A1 Sep. 13, 2018

Related U.S. Application Data

(60) Provisional application No. 62/470,851, filed on Mar. 13, 2017, provisional application No. 62/471,348, filed on Mar. 14, 2017.

(51) Int. Cl.
*H04L 29/08* (2006.01)
*H04L 29/06* (2006.01)
(Continued)

(52) U.S. Cl.
CPC .............. *H04L 67/06* (2013.01); *G06F 8/315* (2013.01); *G06F 8/36* (2013.01); *G06F 9/541* (2013.01); *H04L 41/0233* (2013.01); *H04L 65/4023* (2013.01); *H04L 65/4076* (2013.01); *H04L 65/80* (2013.01); *H04L 67/10* (2013.01); *H04N 21/4345* (2013.01); *H04N 21/4349* (2013.01); *H04N 21/64322* (2013.01); *H04N 5/44* (2013.01)

(58) Field of Classification Search
CPC . H04L 67/06; H04L 41/0233; H04L 65/4023; H04L 65/4076; H04L 65/80; H04L 67/10; G06F 8/315; G06F 8/36; G06F 9/541; G06F 9/542; H04N 21/4345; H04N 21/4349; H04N 21/64322; H04N 5/44
See application file for complete search history.

(56) References Cited

U.S. PATENT DOCUMENTS 8,019,709 B2 * 9/2011 Norton ................... G06N 5/025
706/45
2005/0060372 A1 * 3/2005 DeBettencourt ...... H04L 43/028
709/206

(Continued)

*Primary Examiner* — Benjamin M Thieu
(74) *Attorney, Agent, or Firm* — Dentons US LLP

(57) ABSTRACT

The present invention proposes a method for providing a broadcast content in an apparatus, the method comprising: requesting a filter code to an application running on the apparatus by using a first Application Programming Interface (API); receiving a JavaScript Object Notation (JSON) object from the application in response to the first API; storing the filter code; receiving an Extended File Delivery Table (EFDT) having a first filter code associated with a first file; and selectively downloading the first file by comparing the stored filter code with the first filter code in the EFDT.

10 Claims, 19 Drawing Sheets

(51) Int. Cl.
*G06F 9/54* (2006.01)
*G06F 8/30* (2018.01)
*H04L 12/24* (2006.01)
*H04N 21/434* (2011.01)
*H04N 21/643* (2011.01)
*G06F 8/36* (2018.01)
*H04N 5/44* (2011.01)

(56) References Cited

U.S. PATENT DOCUMENTS

2013/0318536 A1* 11/2013 Fletcher ................ G06F 9/5011
                                                               718/104
2017/0272543 A1* 9/2017 Lo ................... H04N 21/41407

* cited by examiner

FIG. 3

| Syntax | No. of Bits | Format |
|---|---|---|
| LLS_table( ) { | | |
|    LLS_table_id | 8 | uimsbf |
|    provider_id | 8 | uimsbf |
|    LLS_table_version | 8 | uimsbf |
|    switch (LLS_table_id) { | | |
|      case 0x01: | | |
|        SLT | var | Sec. 6.3 |
|        break; | | |
|      case 0x02: | | |
|        RRT | var | See Annex F |
|        break; | | |
|      case 0x03: | | |
|        System Time | var | Sec. 6.4 |
|        break; | | |
|      case 0x04: | | |
|        CAP | var | Sec. 6.5 |
|        break; | | |
|      default: | | |
|        reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcCignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | | | | Use | Data Type |
|---|---|---|---|---|---|
| bundleDescription | | | | | |
| | userServiceDescription | | | | |
| | | @globalServiceID | | 1 | anyURL |
| | | @serviceID | | 1 | unsignedShort |
| | | @serviceStatus | | 0..1 | boolean |
| | | @fullMPDUri | | 1 | anyURL |
| | | @sTSIDUri | | 1 | anyURL |
| | | name | | 0..N | string |
| | | | @lang | 1 | language |
| | | serviceLanguage | | 0..N | language |
| | | capabilityCode | | 0..1 | string |
| | | deliveryMethod | | 1..N | |
| | | | broadcastAppService | 1..N | |
| | | | | basePattern | 1..N | string |
| | | | unicastAppService | 0..N | |
| | | | | basePattern | 1..N | string | t4010

| Element or Attribute Name | | Use | Data Type |
|---|---|---|---|
| S-TSID | | | |
| | @serviceID | 1 | unsignedShort |
| | RS | 1..N | |
| | | @bsid | 0..1 | unsignedShort |
| | | @sIpAddr | 0..1 | string |
| | | @dIpAddr | 0..1 | string |
| | | @dport | 0..1 | unsignedShort |
| | | @PLPID | 0..1 | unsignedByte |
| | | LS | 1..N | |
| | | | @tsi | 1 | unsignedInt |
| | | | @PLPID | 0..1 | unsignedByte |
| | | | @bw | 0..1 | unsignedInt |
| | | | @startTime | 0..1 | dateTime |
| | | | @endTime | 0..1 | dateTime |
| | | | ScrFlow | 0..1 | scrFlowType |
| | | | RepairFlow | 0..1 | rprFlowType | t4020

FIG. 5

| Element or Attribute Name | | | | | | Use |
|---|---|---|---|---|---|---|
| bundleDescription | | | | | | |
| | userServiceDescription | | | | | |
| | | @globalServiceID | | | | M |
| | | @serviceID | | | | M |
| | | Name | | | | 0..N |
| | | | @lang | | | CM |
| | | serviceLanguage | | | | 0..N |
| | | contentAdvisoryRating | | | | 0..1 |
| | | Channel | | | | 1 |
| | | | @serviceGenre | | | 0..1 |
| | | | @serviceIcon | | | 1 |
| | | | ServiceDescription | | | 0..N |
| | | | | @serviceDescrText | | 1 |
| | | | | @serviceDescrLang | | 0..1 |
| | | mpuComponent | | | | 0..1 |
| | | | @mmtPackageId | | | 1 |
| | | | @nextMmtPackageId | | | 0..1 |
| | | routeComponent | | | | 0..1 |
| | | | @sTSIDUri | | | 1 |
| | | | @sTSIDDestinationIpAddress | | | 0..1 |
| | | | @sTSIDDestinationUdpPort | | | 1 |
| | | | @sTSIDSourceIpAddress | | | 1 |
| | | | @sTSIDMajorProtocolVersion | | | 0..1 |
| | | | @sTSIDMinorProtocolVersion | | | 0..1 |
| | | broadbandComponent | | | | 0..1 |
| | | | @fullMPDUri | | | 1 |
| | | ComponentInfo | | | | 1..N |
| | | | @ComponentType | | | 1 |
| | | | @ComponentRole | | | 1 |
| | | | @ComponentProtectedFlag | | | 0..1 |
| | | | @ComponentId | | | 1 |
| | | | @ComponentName | | | 0..1 |

FIG. 6
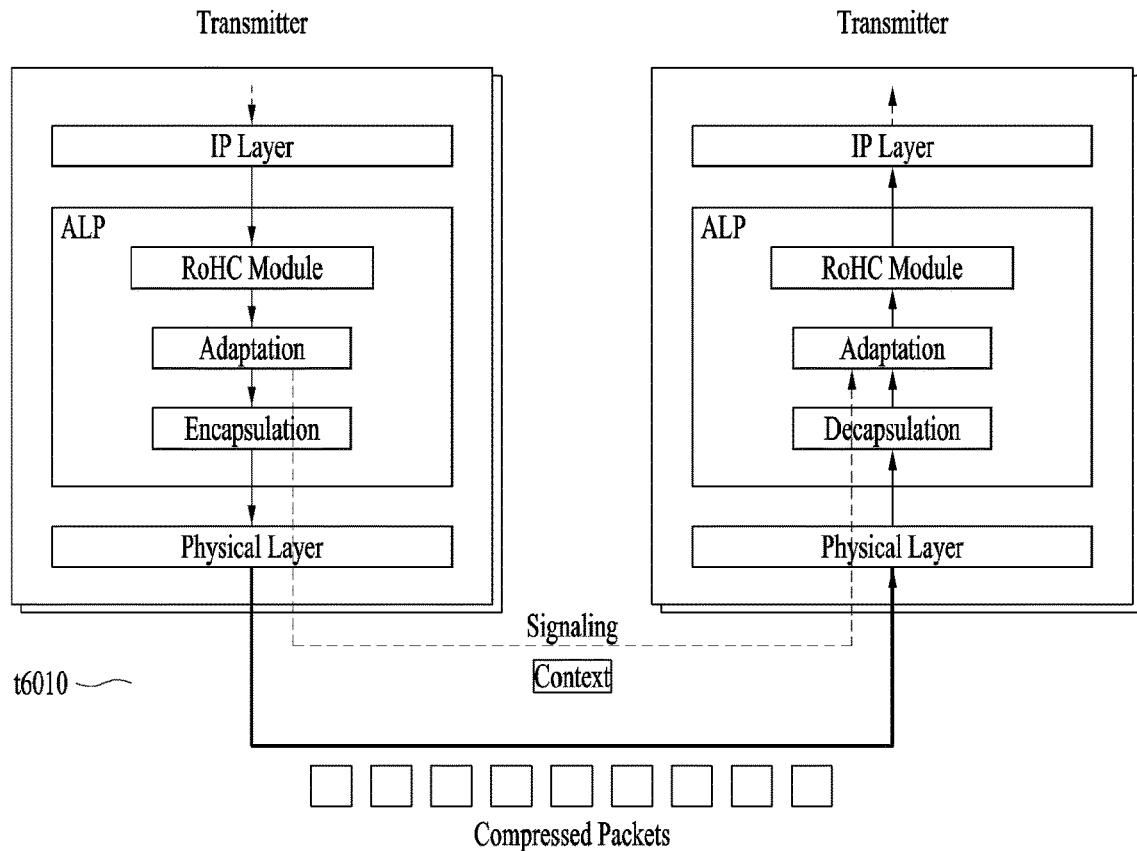
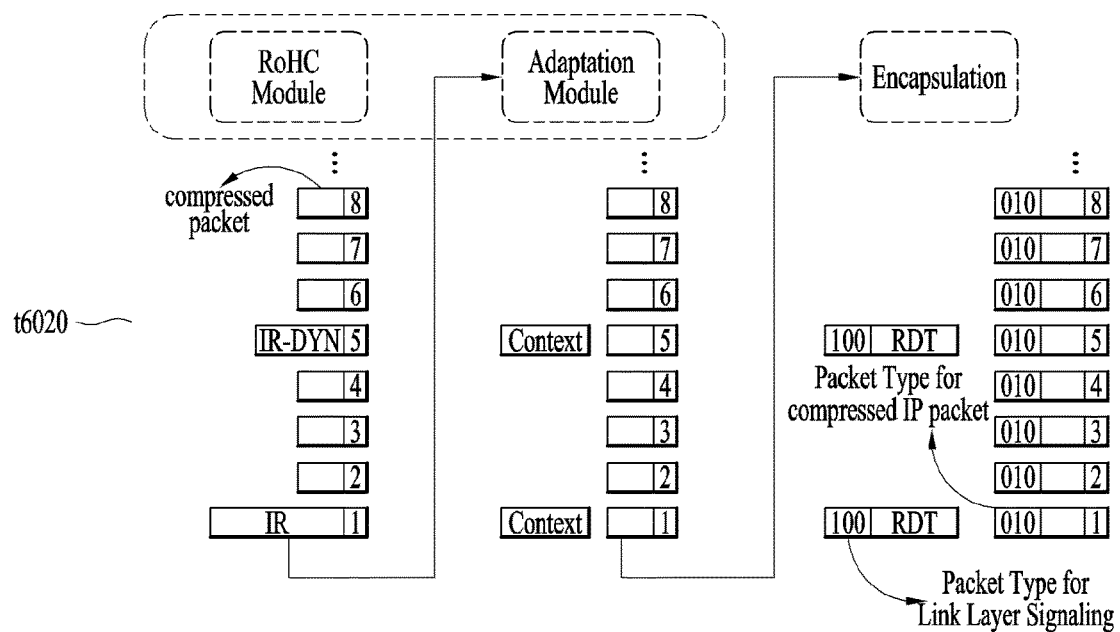

FIG. 7

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i + +) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if (SID_flag = = "1") { | | |
|             SID | 8 | uimsbf |
|         } | | |
|         if (compressed_flag = = "1') { | | |
|             context_id | 8 | uimsbf |
|         } | | |
|     } | | |
| } | | |

FIG. 9

FIG. 13 t13010 — method: "org.atsc.getFilters"
params: Omitted.

t13020 —
```
{
  "type": "object",
  "properties": {
    "filters": {"type": "array", "items": {
      "filterCode": {"type": "integer"},
      "expires": {"type": "string"}
    }, "required": ["filterCode"] }
  }
}
```

FIG. 14 t14010

```
--> {
    "jsonrpc": "2.0",
    "method": "org.atsc.getFilters",
    "id": 57
}
```

```
<-- {
    "jsonrpc": "2.0",
    "result": {
        "filters": [
            { "filterCode": 101, "expires": "2016-07-17T09:30:47" },
            { "filterCode": 102, "expires": "2016-07-17T09:30:47" },
            { "filterCode": 103 }]
    },
    "id": 57
}
``` t14020

FIG. 15

```
method: "org.atsc.setFilters"
params:
{
   "type": "object",
   "properties{
      "filters": {"type": "array", "items": {
         "filterCode": {"type": "integer"},
         "expires": {"type": "string"}
      }, "required": ["filterCode"] }
   }
}
```

FIG. 16 t16010

```
--> {    "jsonrpc": "2.0",
    "method": "org.atsc.setFilters",
    "params": {
        "filters": [
            { "filterCode": 101, "expires": "2016-07-17T09:30:47" },
            { "filterCode": 102, "expires": "2016-07-17T09:30:47" },
            { "filterCode": 103 }]
    },
    "id": 57
}
```

```
<-- {
    "jsonrpc": "2.0",
    "result": {},
    "id": 57
}
``` t16020

FIG. 17

| Element Name | Cardinality | Data Type | Description |
|---|---|---|---|
| DWD | 1 | | |
| DistributionWindow | 1..N | | Broadcast transmission time frame(s) of application-related files. |
| @appContenitLabel | 0..1 | unsignedInt | A label or alias for the application-related file(s) delivered during an instance of Distributionwindow element. Distribution Window instances identified by the same value of the @appContentLabel attribute shall transmit the same application-related file(s). |
| @startTime | 1 | dateTime | Start time of the parent instance of Distributionwindow element |
| @endTima | 1 | dateTime | End time of the parent instance of Distributionwindow element. |
| @lctTSIRef | 1 | dwd:listOfUnsignedInt | A space-separated list of TSI value of the LCT channel in which the application-related files are delivered, during the parent instance of Distributionwindow element. |
| AppContextId | 1..N | anyURI | Defines the Application Context Identifier for this set of Distribution Window Filter Codes. |
| @dwFilterCode | 0..1 | dwd:listOfUnsignedInt | A space-separated list of unsigned integers associated with application content item(s) to be broadcast during the affiliated instance of Distributionwindow element. |

FIG. 18

| @appContentLabel | 10 |
|---|---|
| @startTime | 1488248597 |
| @endTime | 1488255797 |
| ... | ... |
| AppContextID | XXX.XX.XXX |
| @dwFilterCode | 101 201 315 |
| @dwFCexpires | 2890842807 |

APPARATUS FOR TRANSMITTING BROADCAST SIGNALS, APPARATUS FOR RECEIVING BROADCAST SIGNALS, METHOD OF TRANSMITTING BROADCAST SIGNALS AND METHOD OF RECEIVING BROADCAST SIGNALS

This application claims the benefit of U.S. Provisional Patent Application No. 62/470,851, filed on Mar. 13, 2017 and U.S. Provisional Patent Application No. 62/471,348, filed on Mar. 14, 2017, which is hereby incorporated by reference as if fully set forth herein.

TECHNICAL FIELD

The present invention relates to an apparatus for transmitting broadcast signals, an apparatus for receiving broadcast signals, a method of transmitting broadcast signals, and a method of receiving broadcast signals.

BACKGROUND ART

As analog broadcast signal transmission comes to an end, various technologies for transmitting/receiving digital broadcast signals have been developed. A digital broadcast signal may include a larger amount of video/audio data than an analog broadcast signal and further include various types of additional data in addition to the video/audio data.

DISCLOSURE

Technical Problem

That is, a digital broadcast system can provide high definition (HD) images, multi-channel audio and various additional services. However, data transmission efficiency for transmission of large amounts of data, robustness of transmission/reception networks and network flexibility in consideration of mobile reception equipment need to be improved for digital broadcast.

Technical Solution

According to an object of the present invention, as included herein and briefly described, the present invention proposes a system for effectively supporting a next-generation broadcast service in an environment that supports next-generation hybrid broadcast using a terrestrial broadcast network and an Internet protocol (IP) network, and a related signaling scheme.

Advantageous Effects

The present invention proposes a method of efficiently providing hybrid broadcast using both a broadcast network and an IP network.

The present invention proposes a method of providing application-based enhancement based on an application for a basic broadcast service.

The present invention proposes a method of providing application-based enhancement in synchronization with a broadcast service.

The present invention proposes architecture according to various protocols between a primary device (PD) and a companion device (CD), and a communication scheme between applications.

The present invention proposes architecture and a signaling scheme for effectively delivering information about an electronic service guide (ESG), an emergency alert system (EAS), etc. from a PD side to a CD side.

DESCRIPTION OF DRAWINGS

The accompanying drawings, which are included to provide a further understanding of the invention, illustrate embodiments of the invention and together with the description serve to explain the principle of the invention.

FIG. 3 is a diagram showing a low level signaling (LLS) table and a service list table (SLT) according to one embodiment of the present invention.

FIG. 4 is a diagram showing a USBD and an S-TSID delivered through ROUTE according to one embodiment of the present invention.

FIG. 5 is a diagram showing a USBD delivered through MMT according to one embodiment of the present invention.

FIG. 6 is a diagram showing link layer operation according to one embodiment of the present invention.

FIG. 7 is a diagram showing a link mapping table (LMT) according to one embodiment of the present invention.

FIG. 9 illustrates a write operation of a time interleaver according to an embodiment of the present invention.

FIG. 13 is a diagram showing an embodiment of a Get Filter API according to the present invention.

FIG. 14 is a diagram showing an example of using a Get Filter API according to the present invention.

FIG. 15 is a diagram showing an embodiment of a Set Filter API according to the present invention.

FIG. 16 is a diagram showing an example of using the Set Filter API according to the present invention.

FIG. 17 is a diagram showing an embodiment of a DWD according to the present invention.

FIG. 18 is a diagram showing another embodiment of the DWD according to the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that may be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO or MIMO according to one embodiment. A non-MIMO scheme according to an embodiment of the present invention may include a multiple input single output (MISO) scheme, a single input single output (SISO) scheme, etc. The present invention proposes a physical profile (or system) optimized to minimize receiver complexity while attaining the performance required for a particular use case.

Figure 1:
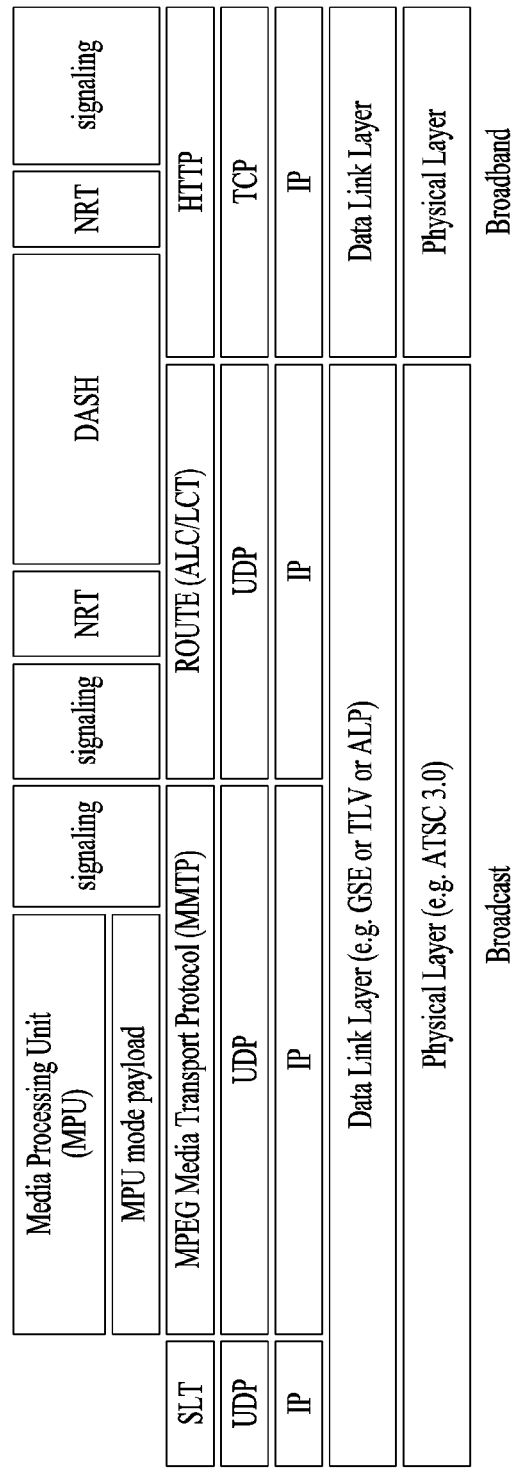
FIG. 1 is a diagram showing a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
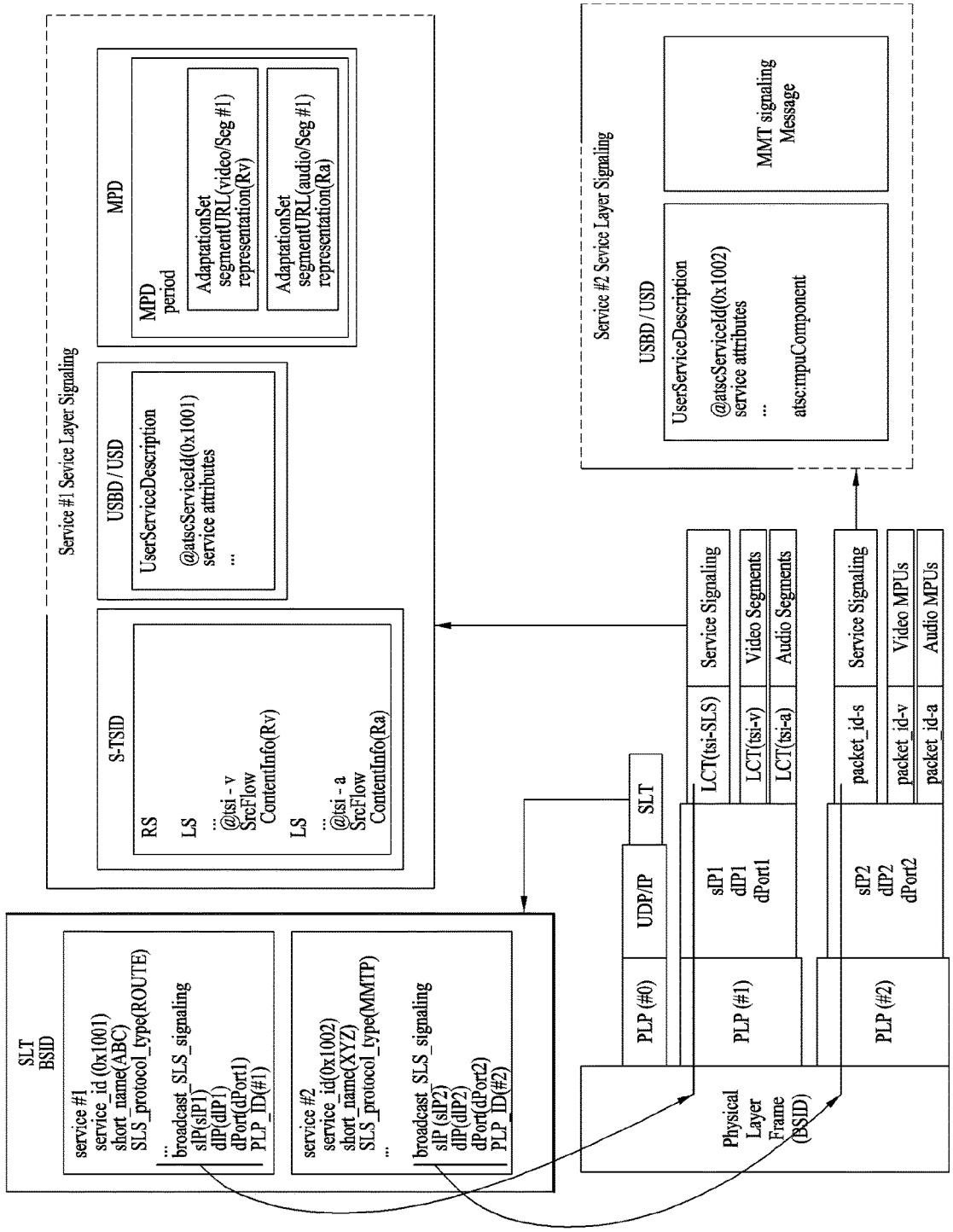
FIG. 2 is a diagram showing a service discovery procedure according to one embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service—IP information—context information—PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may also be referred to as multicast.

Information on IP streams or transport sessions transmitted through a specific PLP may be acquired through the LMT. In contrast, information on through which PLP a specific transport session is delivered may be acquired.

The LMT may be delivered in any PLP identified as carrying LLS. Here, the PLP in which the LLS is delivered may be identified by an LLS flag of L1 detail signaling information of a physical layer. The LLS flag may be a flag field indicating whether the LLS is delivered in the PLP, each PLP. Here, L1 detail signaling information may correspond to the below-described PLS2 data.

That is, the LMT may be delivered in the same PLP along with the LLS. Each LMT shall describe mapping between PLPs and IP addresses/ports as described above. As described above, the LLS may include an SLT and the IP address/port described in the LMT may be any IP address/port associated with any service described in the SLT delivered in the same PLP as the LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, the LMT may describe, in a PLP loop, PLPs for any IP address/port associated with any service described in the SLT delivered together, as described above.

The signaling_type field may indicate the type of signaling information delivered by the table. The value of signaling_type field for the LMT may be set to 0x01. The signaling_type field may be omitted. The PLP_ID field may identify a target PLP to be described. If the PLP loop is used, each PLP_ID field may identify each target PLP. The PLP_ID field and subsequent fields thereof may be included in the PLP loop. The below-described PLP_ID field is an identifier for one PLP of the PLP loop and the below-described fields may be fields for the corresponding PLP.

The num_session field may indicate the number of higher layer sessions delivered through the PLP identified by the corresponding PLP_ID field.

According to the number indicated by the num_session field, information on each session may be included. This information may include a src_IP_add field, a dst_IP_add field, a src_UDP_port field, a dst_UDP_port field, an SID_flag field, a compressed_flag field, an SID field and/or a context_id field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. If header compression is applied (compressed_flag=1), the RDT may be present and the PLP ID field of the RDT may have the same value as the PLP_ID field associated with this compressed_flag field.

The SID field may indicate the SIDs (sub stream IDs) of the link layer packets delivering the transport session. These link layer packets may include SIDs having the same values as this SID field in the optional header thereof. To this end, the receiver may filter link layer packets using LMT information and the SID information of the link layer packet header, without parsing all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
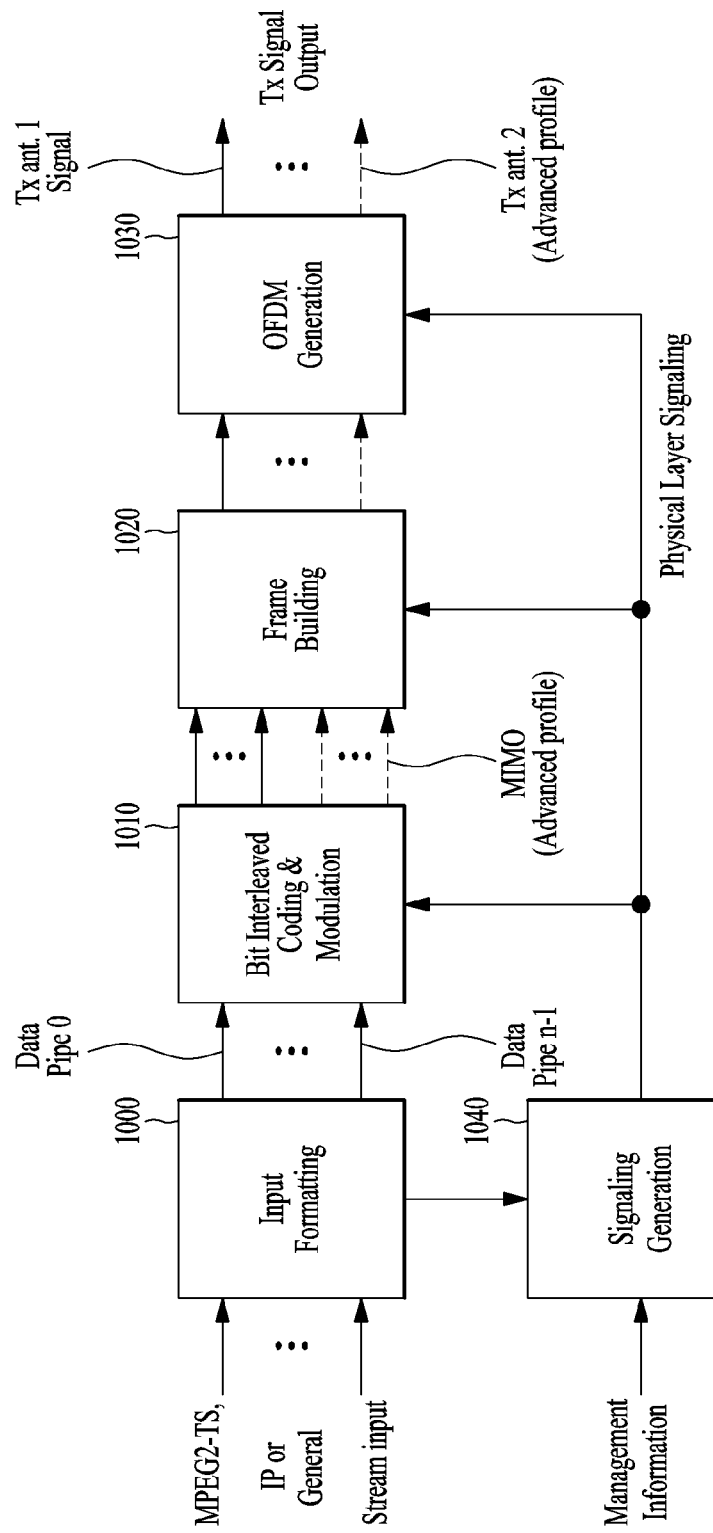
FIG. 8 illustrates a configuration of a broadcast signal transmission apparatus for future broadcast services according to an embodiment of the present invention.

FIG. 8 illustrates a configuration of a broadcast signal transmission apparatus for future broadcast services according to an embodiment of the present invention. The broadcast signal transmission apparatus for future broadcast services according to the present embodiment may include an input formatting block 1000, a bit interleaved coding & modulation (BICM) block 1010, a frame buidling block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams. The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

Since QoS depends on characteristics of a service provided by the broadcast signal transmission apparatus for future broadcast services according to the embodiment of the present invention, data corresponding to respective services needs to be processed using different schemes.

BICM block 1010 may include a proessing block for a profile (or system) to which MIMO is not applied, and a proessing block for a profile (or system) to which MIMO is applied and may comprise a plurality blocks for processing each Data Pipe.

A processing block of the BICM block to which MIMO is not applied may include a data FEC encoder, a bit interleaver, a constellation mapper, a signal space diversity (SSD) encoding block and a time interleaver. A processing block of the BICM block to which MIMO is applied may be distinguished from the processing block of the BICM block to which MIMO is not applied in that the processing block further includes a cell-word demultiplexer and a MIMO encoding block The data FEC encoder performs FEC encoding on an input BBF to generate FECBLOCK procedure using outer coding (BCH) and inner coding (LDPC). The outer coding (BCH) is optional coding method. The bit interleaver may interleave outputs of the data FEC encoder to achieve optimized performance with a combination of LDPC codes and a modulation scheme while providing an efficiently implementable structure. A detailed operation of the bit interleaver will be described later.

The constellation mapper may modulate each cell word from the bit interleaver or the cell-word demultiplexer in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point. This constellation mapping is applied only for DPs. It is observed that QAM-16 and NUQs are square shaped, while NUCs have arbitrary shapes. Both NUQs and NUCs are defined specifically for each code rate and the particular one used is signaled by the parameter DP_MOD field in the PLS2 data. The time interleaver may operates at a DP level. Parameters of time interleaving (TI) may be set differently for each DP. The time interlaever according to an embodiment of the present invention can be positioned between a BICM chain block and a frame builder.

Here, The time interlaever according to an embodiment of the present invention can use both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer. A PLP mode according to an embodiment of the present invention may include a single PLP mode or a multi-PLP mode according to the number of PLPs processed by a broadcast signal transmitter or a broadcast signal transmission apparatus. In the present invention, time interleaving in which different time interleaving schemes are applied according to PLP modes may be referred to as hybrid time interleaving.

The hybrid time interleaver may include a BI and a CI. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be different from a case of PLP_NUM=1. The hybrid time deinterleaver may perform an operation corresponding to an inverse operation of the hybrid time interleaver described above.

The cell-word demultiplexer is used for dividing a single cell-word stream into dual cell-word streams for MIMO processing. The MIMO encoding block may process an output of the cell-word demultiplexer using a MIMO encoding scheme. The MIMO encoding scheme of the present invention may be defined as full-rate spatial multiplexing (FR-SM) to provide capacity increase with relatively small complexity increase at the receiver side. MIMO processing is applied at the DP level. NUQ ($e_{1,i}$ and $e_{2,i}$) corresponding to a pair of constellation mapper outputs is fed to an input of a MIMO encoder and paired MIMO encoder output (g$\mathbf{1}$,$i$ and g$\mathbf{2}$,$i$) is transmitted by the same carrier k and OFDM symbol l of respective TX antennas thereof.

The frame building block 1020 may map the data cells of the input DPs into the OFDM symbols within a frame, and perform frequency interleaving for frequency-domain diversity. A frame according to an embodiment of the present invention is further divided into a preamble, one or more frame signaling symbols (FSSs), normal data symbols. The preamble provides a set of basic transmission parameters for efficient transmission and reception of a signal. And the preamble indicates whether the emergency alert service (EAS) is provided in a current frame or not. A main purpose of the FSS is to carry PLS data. For fast synchronization and channel estimation, and hence fast decoding of PLS data, the FSS has a dense pilot pattern than a normal data symbol.

The frame building block 1020 may include a delay compensation block for adjusting timing between DPs and corresponding PLS data to ensure that the DPs and the corresponding PLS data are co-timed at a transmitter side, a cell mapper for mapping PLS, DPs, auxiliary streams, dummy cells, etc. to active carriers of the OFDM symbols in the frame and a frequency interleaver.

The frequency interleaver may randomly interleave data cells received from the cell mapper to provide frequency diversity. In addition, the frequency interleaver may operate on data corresponding to an OFDM symbol pair including two sequential OFDM symbols or an OFDM symbol using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

The signaling generation block 1040 may create physical layer signaling information used for an operation of each functional block. Signaling information according to an embodiment of the present invention may include PLS data. The PLS data includes PLS1 data and PLS2 data. The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group.

The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame. PLS2 data can include FIC_flag information. FIC (fast information channel) is a dedicated channel for carrying cross-layer information to enable fast service acquisition and channel scanning. FIC_FLAG is a 1-bit field and indicates whether the FIC is used in a current frame. If this field is set to '1', the FIC is provided in the current frame. If this field set to '0', the FIC is not carried in the current frame.

The BICM block 1010 may include BICM block for protection of the PLS data including a PLS FEC encoder, a bit interleaver and a constellation mapper.

The PLS FEC encoder may include a scrambler for scrambling PLS1 data and PLS2 data, a BCH encoding/zero insertion block for outer encoding on the scrambled PLS 1,2 data using a shortened BCH code for PLS protection, and insert zero bits after BCH encoding, an LDPC encoding block for LDPC encoding using an LDPC code and an LDPC parity puncturing block. The bit interleaver may interleave each of shortened and punctured PLS1 data and PLS2 data. The constellation mapper may map the bit-ineterlaeved PLS1 data and PLS2 data to constellations.

The broadcast signal reception apparatus for future broadcast services according to the embodiment of the present invention may correspond to the broadcast signal transmission apparatus for future broadcast services described with reference to FIG. 8.

The broadcast signal reception apparatus for future broadcast services according to the embodiment of the present invention may include a synchronization & demodulation module carrying out demodulation corresponding to a reverse procedure of a procedure performed by the broadcast signal transmission apparatus, a frame parsing module parsing input signal frames and extracting data through which a service selected by a user is transmitted, a demapping & decoding module which convert input signals into bit domain data and then deinterleave the same as necessary, perform demapping of mapping applied for transmission efficiency and correct an error generated on a transmission channel through decoding, an output processor performing reverse procedures of various compression/signal processing procedures which are applied by the broadcast signal transmission apparatus and a signaling decoding module obtaining PLS information from a signal demodulated by the synchronization & demodulation module.

The frame parsing module, the demapping & decoding module and the output processor may execute functions thereof using data output from the signaling decoding module.

According to an embodiment of the present invention, each TI group is either mapped directly to one frame or spread over $P_I$ frames. Each TI group is also divided into more than one TI block ($N_{TI}$), where each TI block corresponds to one usage of a time interleaver memory. The TI blocks within the TI group may contain slightly different numbers of XFECBLOCKs. Typically, the time interleaver may also function as a buffer for DP data prior to a process of frame building.

The Time interleaving according to an embodiment of the present invention is a twisted row-column block interleaver. The twisted row-column block interleaver according to an embodiment of the present invention may column-wise wite a first XFECBLOCK into a first column of a TI memory, and a second XFECBLOCK into a next column, and so on). Then, in an interleaving array, cells are diagonal-wise read diagonal-wise from a first row (rightwards along a row beginning with a left-most column) to a last row, $N_r$ cells are read out Moreover, in order to achieve single-memory deinterleaving at a receiver side regardless of a number of XFECBLOCKs in a TI block the twisted row-column block interleaver may insert the virtual XFECBLOCKs into the TI memory. The virtual XFECBLOCKs must be inserted infront of other FECBLOCKS to achieve single-memory deinterleaving at a receiver side.

Figure 9:
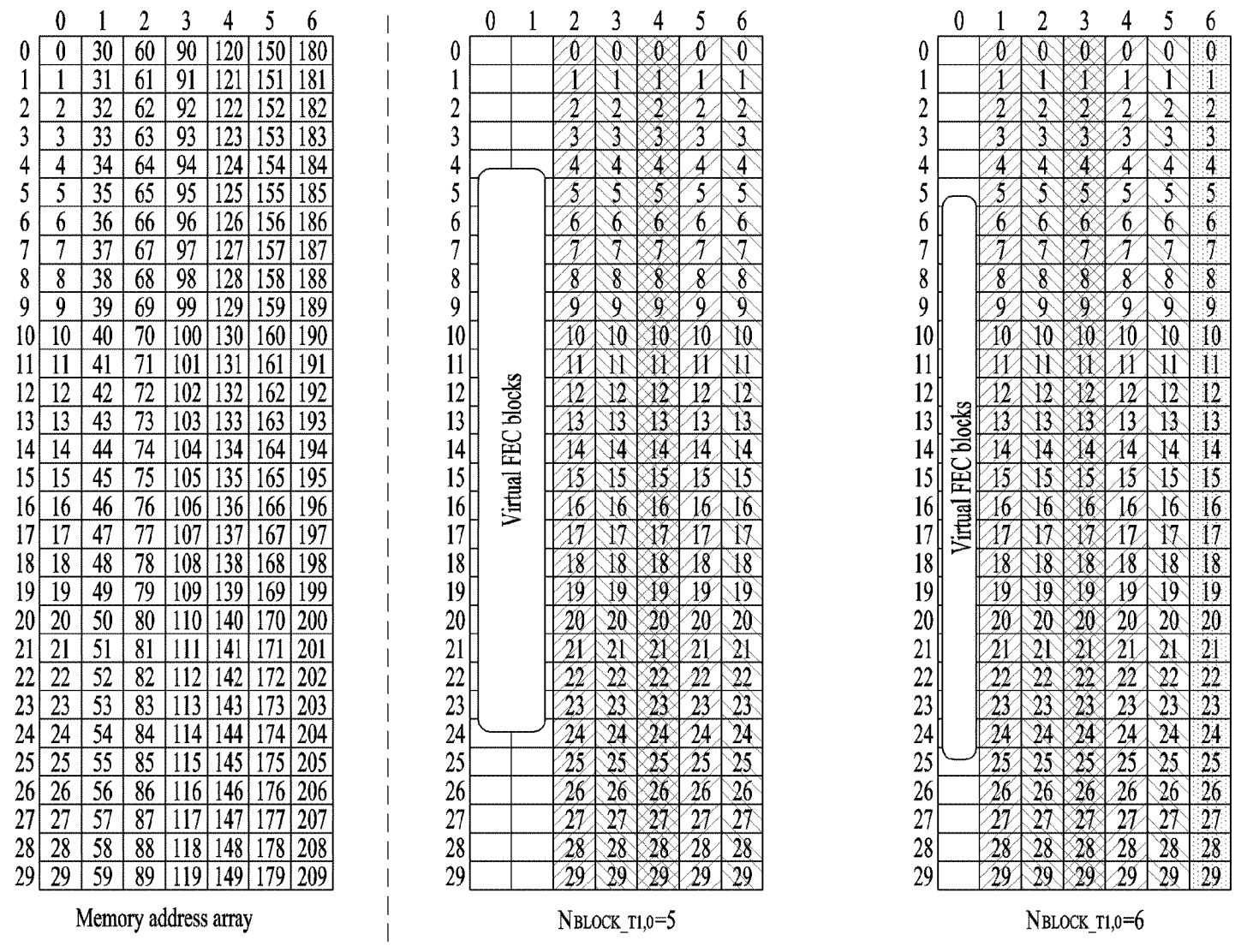

FIG. 9 illustrates a write operation of a time interleaver according to an embodiment of the present invention.

A left block in the figure illustrates a TI memory address array, and right blocks in the figure illustrate a write operation when two virtual FEC blocks and one virtual FEC block are inserted into heads of two contiguous TI groups, respectively.

The frequency interleaver according to the present embodiment may include an interleaving address generator for generating an interleaving address for applying corresponding data to a symbol pair.

Figure 10:
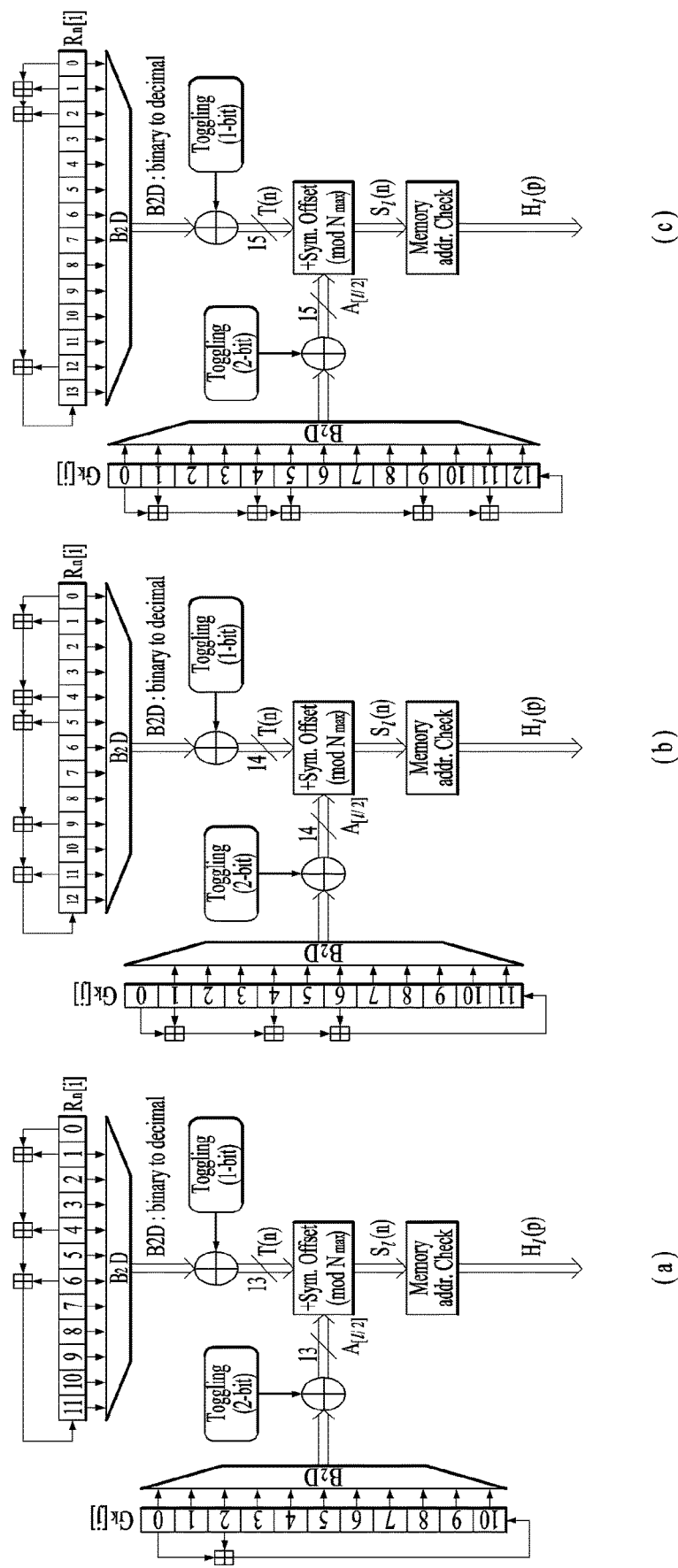
FIG. 10 illustrates an interlaving address generator including a main pseudo-random binary sequence (PRBS) generator and a sub-PRBS generator according to each FFT mode which are included in a frequency interleavaer according to an embodiment of the present invention.

FIG. 10 illustrates an interlaving address generator including a main pseudo-random binary sequence (PRBS) generator and a sub-PRBS generator according to each FFT mode which are included in a frequency interleavaer according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l}=[x_{m,l,0}, \ldots, x_{m,l,p}, \ldots, x_{m,l,Ndata-1}]$ for $l=0, \ldots, N_{sym}-1$, where $x_{m,l,p}$ is the $p^{th}$ cell of the $l^{th}$ OFDM symbol in the $m^{th}$ frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $P_{m,l}=[v_{m,l,0}, \ldots, v_{m,l,Ndata-1}]$ $l=0, \ldots, N_{sym}-1$.

For the OFDM symbol pair, the interleaved OFDM symbol pair is given by $v_{m,l,Hi(p)}=x_{m,l,p}$, $p=0, \ldots, N_{data}-1$, for the first OFDM symbol of each pair $v_{m,l,p}=x_{m,l,Hi(p)}$, $p=0, \ldots, N_{data}-1$, for the second OFDM symbol of each pair, where $H_l(p)$ is the interleaving address generated based on a PRBS generator and a cyclic shift value (symbol offset) of a sub-PRBS generator.

Figure 11:
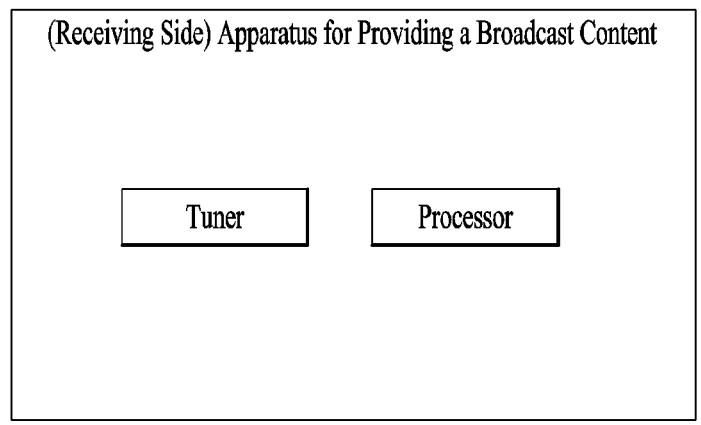
FIG. 11 is a diagram showing a reception-side broadcast content provision apparatus according to an aspect of the present invention.

FIG. 11 is a diagram showing a reception-side broadcast content provision apparatus according to an aspect of the present invention.

According to an aspect, the present invention may be related to a reception-side broadcast content provision apparatus. The reception-side broadcast content provision apparatus may provide personalized broadcast content using a filter code.

Specifically, the reception-side broadcast content provision apparatus may acquire a filter code from an application using an API, compare the acquired filter code with a filter code in signaling information to determine whether broadcast content data related to the signaling data is received, and selectively receive the broadcast content data.

The reception-side broadcast content provision apparatus according to the present invention may include a tuner and/or a processor.

The processor may request a filter code from an application launched in the reception-side broadcast content provision apparatus. In addition, the processor may receive (acquire) the filter code from the application and store the filter code in the broadcast content provision apparatus. In addition, the processor may compare the filter code in the signaling information with the stored filter code and determine whether broadcast content data associated with the filter code in the signaling information is downloaded (received) or not.

The tuner may receive signaling information. This signaling information may include an EFDT (Extended File Delivery Table). In addition, the tuner may receive the broadcast content data, if the processor decides to receive the broadcast content data.

Here, the application stores the filter code in the reception-side broadcast content provision apparatus or acquires the filter code from the network server of a broadcaster. Such operation may be performed through a WebSocket command and a control interface.

In one embodiment of the reception-side broadcast content provision apparatus according to the present invention, the processor may request the filter code from the application using a first API. Here, the first API may correspond to the below-described Get Filter API.

In another embodiment of the reception-side broadcast content provision apparatus according to the present invention, the filter code may be a value indicating a personalization category. In some embodiments, the filter code may be determined by the broadcaster. For example, the filter code may be given to a truck driver, a zip code, a gender, etc. according to a specific personalization category of the broadcaster. The filter code acquired from the network server of the broadcaster is related to the user of the reception-side broadcast content provision apparatus and may be used to provide personalized broadcast content to the user. In some embodiments, the filter code may be associated with broadcast content data. The filter code associated with the broadcast content data may indicate a personalization description of the broadcast content data (file, etc.) The filter code may be unique in a range of an AppContext ID. In some embodiments, the filter code may be an unsigned integer.

In another embodiment of the reception-side broadcast content provision apparatus according to the present invention, the processor may receive a JSON (JavaScript Object Notation) object from the application in response to the first API. In some embodiments, this JSON object may include a pair of a filter code and expiration information. This filter code may be given to the reception-side broadcast content provision apparatus. In some embodiments, expiration information may indicate an expiration time of the filter code or a valid period of the filter code.

In another embodiment of the reception-side broadcast content provision apparatus according to the present invention, the broadcast content provision apparatus may further include a storage. The above-described processor may store the filter code acquired from the application in the storage.

In another embodiment of the reception-side broadcast content provision apparatus according to the present invention, the application may use the stored filter code regardless of communication with the network server of the broadcaster or whether the application is launched or not. For example, if the application is terminated and then is launched again (a user switches to another channel and returns to an original channel), it may be impossible to access broadband in order to acquire personal information through the network server of the broadcaster. Even in this case, the application may use the stored filter code to provide personalized broadcast content.

In another embodiment of the reception-side broadcast content provision apparatus according to the present invention, the EFDT may be a signaling table for providing a description of files related to the broadcast content data and/or NRT files. The EFDT may include information on the files of the broadcast content and information on transmission thereof. The EFDT may be one type of signaling information.

In another embodiment of the reception-side broadcast content provision apparatus according to the present invention, the EFDT may include a filter code associated with the broadcast content related file. This filter code may be associated with the file and may be used to determine whether the file is necessary to provide personalized broadcast content and to determine whether the personalized broadcast content is received or not. In some embodiments, the EFDT may include a first filter code associated with a first file. Here, the first file may be one of broadcast content data. The first filter code may indicate a personalization description of the first file.

In another embodiment of the reception-side broadcast content provision apparatus according to the present invention, the processor may determine that a related file is downloaded, if the filter code of the EFDT is equal to the stored filter code.

In another embodiment of the reception-side broadcast content provision apparatus according to the present invention, the tuner may selectively download the file, if the processor determines that the file is downloaded (received). In some embodiments, the tuner may receive the file over a broadcast network. In some embodiments, the tuner may receive the file over a broadcast network using a NRT (Non-Real Time) method.

In another embodiment of the reception-side broadcast content provision apparatus according to the present invention, the tuner may further receive a DWD (Distribution Window Description) as one of the signaling information. The processor may compare the filter code in the DWD with the stored filter code to determine whether the broadcast content data related to the filter code in the DWD is received or not. The tuner may receive the broadcast content data, if the processor determines that the broadcast content data is received.

In another embodiment of the reception-side broadcast content provision apparatus according to the present invention, the DWD may indicate time intervals for transmitting one or more files. The DWD may be one of signaling mechanisms for notifying a receiver of when a specific type of NRT data (file or media segment) will be delivered. The DWD may have filter codes associated with files to be delivered in a distribution window. The DWD may include information on at least one distribution window. Here, the distribution window may mean a time interval scheduled to deliver broadcast content related files. The DWD may include information on start and end times of the distribution window and files delivered in the distribution window. In addition, the DWD may include filter codes for the files. The receiver may determine whether the given distribution window is a window of interest using the filter codes from the viewpoint of personalization. Upon determining that a specific file is necessary to provide the personalized broadcast content using the filter codes and the distribution window information, the receiver may access an appropriate broadcast stream at a file delivery time and download (receive) the corresponding file. The DWD may belong to application signaling.

In another embodiment of the reception-side broadcast content provision apparatus according to the present invention, the DWD may include information indicating a distribution window in which a second file is transmitted and a second filter code. Here, the second file may be one of the broadcast content related data. The second filter code may be a filter code indicating a personalization description of the second file.

In another embodiment of the reception-side broadcast content provision apparatus according to the present invention, the processor may determine that the related file is downloaded, if the filter code of the DWD is equal to the stored filter code.

In another embodiment of the reception-side broadcast content provision apparatus according to the present invention, the tuner may selectively download the file, when the processor determines that the file is downloaded (received). The processor may compare the second filter code in the DWD with the stored filter code to determine whether the second file is downloaded (received). In this case, the tuner may tune to an appropriate broadcast stream in the distribution window indicated by the DWD, thereby selectively receiving the second file. In some embodiments, the tuner may receive the file over the broadcast network. In some embodiments, the tuner may receive the file over the broadcast network using the NRT method.

In another embodiment of the reception-side broadcast content provision apparatus according to the present invention, the broadcast content provision apparatus may perform the selective downloading process even when the application does not operate. For example, the broadcast content provision apparatus may perform the above-described selective downloading process even in a standby mode during a time corresponding to the distribution window.

In another embodiment of the reception-side broadcast content provision apparatus according to the present invention, the application may enable the broadcast content provision apparatus to store the filter code using the second API. The second API may correspond to the below-described Set Filter API.

In another embodiment of the reception-side broadcast content provision apparatus according to the present invention, the second API may include a parameter having a second object. The second object may include a pair of a filter code and expiration information. In some embodiments, expiration information may indicate an expiration time of the filter code or a valid period of the filter code.

In another embodiment of the reception-side broadcast content provision apparatus according to the present invention, the above-described first API may be used for the broadcast content provision apparatus to acquire the filter code from the application. The first API may be issued by the broadcast content provision apparatus.

In another embodiment of the reception-side broadcast content provision apparatus according to the present invention, the above-described second API may be used for the application to set or store the filter code in the broadcast content provision apparatus. The second API may be issued by the application.

In another embodiment of the reception-side broadcast content provision apparatus according to the present invention, after the reception-side broadcast content provision apparatus receives a specific file based on a specific filter code, if the application provides a new filter code set excluding the specific filter code using a Set Filter API, the reception-side broadcast content provision apparatus may delete the specific file.

In the reception-side broadcast content provision apparatus according to the present invention and the embodiments thereof, the broadcast content provision apparatus may determine which filter code is applicable to the user of the reception side to provide personalized broadcast content.

In the reception-side broadcast content provision apparatus according to the present invention and the embodiments thereof, the broadcast content provision apparatus may suppress unnecessary data from occupying the memory through selective data reception.

The above-described embodiments of the reception-side broadcast content provision apparatus according to the present invention may be combined. In addition, the internal components of the reception-side broadcast content provision apparatus according to the present invention may be added, changed, replaced or deleted according to embodiment. In addition, the above-described internal components may be implemented by hardware components.

Figure 12:
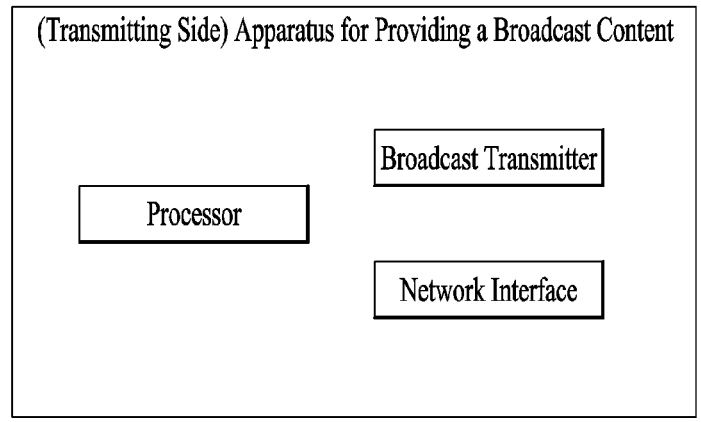
FIG. 12 is a diagram showing a transmission-side broadcast content provision apparatus according to another aspect of the present invention.

FIG. 12 is a diagram showing a transmission-side broadcast content provision apparatus according to another aspect of the present invention.

According to another aspect, the present invention may be related to the transmission-side broadcast content provision apparatus. The transmission-side broadcast content provision apparatus may support personalized broadcast content provision using the filter code. The transmission-side broadcast content provision apparatus may be a transmission-side apparatus corresponding to the above-described reception-side broadcast content provision apparatus.

Specifically, the transmission-side broadcast content provision apparatus may generate broadcast content, generate a filter code for the broadcast content data, generate an EFDT including the filter code, and transmit the broadcast content data and the EFDT over a broadcast network. Meanwhile, a filter code capable of being specified in a receiver may be generated and transmitted to an application in the receiver over broadband.

The transmission-side broadcast content provision apparatus according to the present invention may include a processor, a broadcast receiver and/or a network interface.

The processor may generate broadcast content data for providing broadcast content. In addition, the processor may generate a filter code for the broadcast content data. This filter code was described above. In addition, the processor may generate an EFDT. The EFDT may include a description of the broadcast content data, that is, a file, and a filter code for the file. In addition, the processor may generate a filter code capable of being specified in a receiver.

The broadcast transmitter may transmit signaling information such as the generated broadcast content data and/or the EFDT over a broadcast network.

The network interface may transmit the filter code capable of being specified in the receiver to the application of the receiver over broadband.

The transmission-side broadcast content provision apparatus according to the present invention may have embodiments corresponding to the above-described reception-side broadcast content provision apparatus according to the present invention. The transmission-side broadcast content provision apparatus according to the present invention and the internal components thereof may perform the embodiments corresponding to the embodiments of the above-described reception-side broadcast content provision apparatus according to the present invention.

The above-described embodiments of the transmission-side broadcast content provision apparatus according to the present invention may be combined. In addition, the internal components of the transmission-side broadcast content provision apparatus according to the present invention may be added, changed, replaced or deleted according to embodiment. In addition, the above-described internal components may be implemented by hardware components.

FIG. 13 is a diagram showing an embodiment of a Get Filter API according to the present invention.

The Get Filter API according to the present invention may be used for the reception-side broadcast content provision apparatus to acquire filter information to filter information from an application. The reception-side broadcast content provision apparatus may issue the Get Filter API to request the filter code from the application (broadcaster application). The application may send a response to the Get Filter API to the reception-side broadcast content provision apparatus. As described above, the filter code may be used to determine which file is received (downloaded) in place of the application.

In one embodiment of the shown Get Filter API, the Get Filter API (t13010) may be defined as "org.atsc.getFilters". Here, parameters may be omitted. The response to the Get Filter API (t13020) may include a JSON (JavaScript Object Notation) object. This JSON object may include a pair of key/value. Specifically, the JSON object may include a pair of a filter code and expiration information.

Specifically, the JSON object may include "type" and "properties" elements. Here, the "type" element may indicate that the JSON object is of an "object" type. The "properties" element may describe the properties of the JSON object.

The "properties" element may include "filters" and/or "required" elements. The "filters" element may include filtering related information. The "required" element may indicate that the below-described "filterCode" element is a mandatory element.

The "filters" element may include a "type" element indicating that the element is of an "array" type and an "items" element including filtering related information.

The "items" element may include a "filterCode" element and/or an "expires" element. These two elements may form a pair.

The "filterCode" element may indicate the above-described filter code. This element may be of an "integer" type. In some embodiments, the filter code may be of an unsigned integer type as described above.

The "expires" element may indicate the above-described expiration information. This element may be of a "string" type. This expiration information may be represented in a dateTime XML data type defined in XSD Datatypes. The expiration information of this element may indicate an expiration time of the filter code indicated by the "filterCode" element. After the expiration time, the filter code may not be used.

In another embodiment of the Get Filter API, the "expires" element may be omitted. In this case, the filter code indicated by the "filterCode" element may have an indefinite lifetime without expiration.

In another embodiment of the Get Filter API, the "expires" element is a mandatory element and may always be present to form a pair with the "filterCode" element. In this case, the "required" element may indicate that the "filterCode" element and the "expires" element are mandatory elements.

In another embodiment of the Get Filter API, the "filters" element may be indicated in a list of unsigned integers separated into a white space. At this time, each unsigned integer value may mean a filter code. In some embodiments, the filter codes may be associated with the broadcast content data transmitted through the distribution window. In this case, the "filters" element may be of a "string" type.

In another embodiment of the Get Filter API, the "expires" element may be represented in the format of a full 64-bit NTP (Network Time Protocol) timestamp.

In another embodiment of the Get Filter API, the "expires" element may further include a "format" element. The "format" element may indicate the format of the expiration information of the "expires" element. For example, the "format" element may indicate that the expiration information has a format of "date-time".

In the embodiments of the reception-side broadcast content provision apparatus according to the present invention, the Get Filter API may be the Get Filter API according to the above-described embodiments.

FIG. 14 is a diagram showing an example of using a Get Filter API according to the present invention.

In the example of using the shown Get Filter API, the reception-side broadcast content provision apparatus may issue a Get Filter API (t14010). To this end, the reception-side broadcast content provision apparatus may request the filter code from the application. This Get Filter API may have a value of "method" of "org.atsc.getFilters" and an "id" value of 57.

In the example of using the shown Get Filter API, the application may send a JSON object in response to the Get Filter API. This JSON object may include a total of three pieces of filter information.

First filter information may indicate that the filter code is 101 ("filterCode": 101) and the filter code expires Jul. 17, 2016, at 09:30:47 ("expires": 2016-07-17T09:30:47). Second filter information may indicate that the filter code is 102 ("filterCode": 102) and the filter code expires Jul. 17, 2016, at 09:30:47 ("expires": 2016-07-17T09:30:47). Third filter information may indicate that the filter code is 103 ("filterCode": 103) and the expiration time of the filter code is not decided. In addition, the JSON object may have an "id" value of 57.

FIG. 15 is a diagram showing an embodiment of a Set Filter API according to the present invention.

The Set Filter API according to the present invention may be used for the application to store the filter code in the reception-side broadcast content provision apparatus. The application launched in the reception-side broadcast content provision apparatus may issue a Set Filter API. To this end, the application may enable the reception-side broadcast content provision apparatus to store a specific filter code. As described above, the reception-side broadcast content provision apparatus may selectively download an NRT data file using this filter code. In this process, the stored filter code and the filter code associated with the broadcast content data in the EFDT and DWD may be compared with each other.

The Set Filter API may establish a set of filter codes. In this process, previous filter code setting may be cancelled. Here, a cookie, a separate storage, etc. may be used to maintain the filter codes for the reception-side broadcast content provision apparatus.

In one embodiment of the shown Set Filter API, the Set Filter API may be defined as "org.atsc.setFilters". The Set Filter API may further include a parameter.

The parameter may include a "type" element and/or a "properties" element. The "type" element may indicate that the parameter is of an "object" type. The "properties" element may indicate the properties of the parameter.

The "properties" element may include a "filters" element and/or a "required" element. The "filters" element may include filter-related information. The "required" element may indicate that the below-described "filterCode" element is a mandatory element.

The "filters" element may include a "type" element and/or an "items" element. The "type" element may indicate that the "filters" element is of an "array" type. The "items" element may include a filter code and/or expiration information.

The "items" element may include a "filterCode" element and/or an "expires" element.

The "filterCode" element may indicate the above-described filter code. This element may be of an "integer" type. In some embodiments, the filter code may be of an unsigned integer type as described above. Here, the broadcaster may maintain uniqueness of the filter code in a range of AppContextID.

The "expires" element may indicate the above-described expiration information. This element may be of a "string" type. This expiration information may be represented in a dateTime XML data type defined in XSD Datatypes. The expiration information of this element may indicate the expiration time of the filter code indicated by the "filterCode" element. After the expiration time, the filter code may not be used.

In another embodiment of the Set Filter API, the "expires" element may be omitted. In this case, the filter code indicated by the "filterCode" element may have indefinite lifetime without expiration.

In another embodiment of the Set Filter API, the "expires" element is a mandatory element and may always be present to form a pair with the "filterCode" element. In this case, the "required" element may indicate that the "filterCode" element and the "expires" element are mandatory elements.

In another embodiment of the Set Filter API, the reception-side broadcast content provision apparatus may not use application filter code information delivered through the Set Filter API.

In another embodiment of the Set Filter API, the "filters" element may be indicated in a list of unsigned integers separated into a white space. At this time, each unsigned integer value may mean a filter code. In some embodiments, the filter codes may be associated with the broadcast content data transmitted through the distribution window. In this case, the "filters" element may be of a "string" type.

In another embodiment of the Set Filter API, the "expires" element may be represented in the format of a full 64-bit NTP (Network Time Protocol) timestamp.

In another embodiment of the Set Filter API, the application may provide all filter codes to the reception-side broadcast content provision apparatus. The application cannot determine how long the reception-side broadcast content provision apparatus maintains the filter code. Accordingly, all filter codes may be delivered through the Set Filter API. In this case, the filter codes delivered through the Set Filter API may replace pre-stored filter codes.

In another embodiment of the Set Filter API, the application may provide a null filter code to delete all the filter codes stored in the reception-side broadcast content provision apparatus.

In another embodiment of the Set Filter API, the "expires" element may further include a "format" element. The "format" element may indicate the format of the expiration information of the "expires" element. For example, the "format" element may indicate that the expiration information has a format of "date-time".

In the embodiments of the reception-side broadcast content provision apparatus according to the present invention, the Set Filter API may be the Set Filter API according to the above-described embodiments.

FIG. 16 is a diagram showing an example of using the Set Filter API according to the present invention.

In the example of using the shown Set Filter API, the application may issue the Set Filter API to provide a total of three pieces of filter information to the reception-side broadcast content provision apparatus (t16010).

First filter information may indicate that the filter code is 101 ("filterCode": 101) and the filter code expires Jul. 17, 2016, at 09:30:47 ("expires": 2016-07-17T09:30:47). Second filter information may indicate that the filter code is 102 ("filterCode": 102) and the filter code expires Jul. 17, 2016, at 09:30:47 ("expires": 2016-07-17T09:30:47). Third filter information may indicate that the filter code is 103 ("filterCode": 103) and the expiration time of the filter code is not decided. In addition, the Set Filter API may have an "id" value of 57.

In the example of using the shown Set Filter API, the reception-side broadcast content provision apparatus sends a response (t16020). This response may have a null "result" and have an "id" value of 57.

FIG. 17 is a diagram showing an embodiment of a DWD according to the present invention.

The DWD according to the present invention may indicate a time interval scheduled to transmit one or more files (distribution window). The DWD may have filter codes associated with files to be delivered in the distribution window.

In one embodiment of the shown DWD, the DWD may include one or more DistributionWindow elements. One DistributionWindow element may indicate one distribution window. Files related to the broadcast content data may be transmitted through the distribution window. More specifically, the files may be transmitted through an LCT channel indicated by the below-described @lctTSIRef attribute.

The @appContentLabel attribute may indicate a label for the files to be delivered through the distribution window.

The @startTime attribute may indicate a start time of a time interval indicated by the distribution window. The @endTime attribute may indicate an end time of a time interval indicated by the distribution window.

The @lctTSIRef attribute may indicate an LCT channel which is a path for transmitting the files delivered in the distribution window. This attribute may be the TSI (Transport Session Identifier) value of the LCT channel.

The AppContextId element may indicate an Application Context ID. The Application Context ID may be a URI indicating an application resource to be commonly used between a plurality of applications. The AppContextId element may include an @dwFilterCode attribute.

The @dwFilterCode attribute may indicate the filter codes for the broadcast content data transmitted through the distribution window. This attribute may be a list of the values indicating the filter codes separated into a space. The filter codes may be unique in an Application Context ID range of an AppContextId element.

Using the DWD and the filter codes in the DWD, it is possible to determine with which filter codes the broadcast content data to be delivered through the distribution window is associated. Using this, the reception-side broadcast content provision apparatus may determine whether specific broadcast content data is suitable for provision of personalized broadcast content and, if suitable, determine which LCT channel is accessed in which distribution window (time interval) in order to receive this broadcast content data.

FIG. 18 is a diagram showing another embodiment of the DWD according to the present invention.

In another embodiment of the shown DWD, the @appContentLabel may have a value of 10, the @startTime may have a value of 1488248597, and the @endTime may have a value of 1488255797. In this case, the distribution window indicated by the DWD may be a time interval starting at 1488248597 and ending at 1488255797.

In addition, in another embodiment of the shown DWD, the AppContextID element may include an @dwFilterCode attribute and an @dwFCexpires attribute. The @dwFilterCode attribute may has a value of "101 201 315", which may indicate that the broadcast content data delivered through the distribution window have filter codes of 101, 201 and 315. The @dwFCexpires attribute may include expiration information of the filter codes. The expiration information may indicate a time when the filter codes expire.

In another embodiment of the shown DWD, the reception-side broadcast content provision apparatus may store a filter code of 101. Since this reception-side broadcast content provision apparatus transmits broadcast content data having a matching filter code in the distribution window, the file may be downloaded in the distribution window. However, if the reception-side broadcast content provision apparatus stores a filter code of 314, since there is no matching filter code, no file may be downloaded in the distribution window.

In the embodiments of the reception-side broadcast content provision apparatus according to the present invention, the DWD may be the DWD according to the above-described embodiments.

Figure 19:
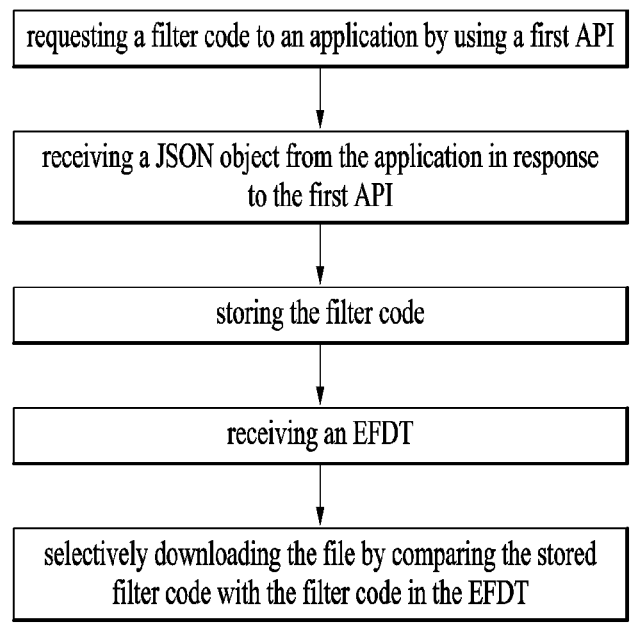
FIG. 19 is a diagram showing a method of providing broadcast content at a reception side in a reception-side broadcast content provision apparatus according to the present invention.

FIG. 19 is a diagram showing a method of providing broadcast content at a reception side in a reception-side broadcast content provision apparatus according to the present invention.

The method of providing the broadcast content at the reception side may include requesting a filter code from an application using a first API, receiving a JSON object from the application in response to the first API, storing the filter code, receiving an EFDT and/or comparing the stored filter code with the filter code of the EFDT to selectively download a file.

The processor of the reception-side broadcast content provision apparatus may issue the first API to request the filter code from the application launched in the apparatus. The filter code may be an unsigned integer and may be associated with a personalized category determined by the broadcaster.

The processor may receive a JSON object from the application in response to the first API. The JSON object may include a pair of the filter code and expiration information indicating the expiration time of the filter code.

The processor may store the filter code in a storage.

A tuner may receive an EFDT. The EFDT may include a first filter code associated with a first file. The first filter code may indicate a personalization description of the first file.

The processor may compare the stored filter code with the first filter code in the EFDT to determine whether the first file is downloaded or not. The tuner may selectively download the first file according to decision of the processor.

In another embodiment of the method of providing broadcast content at a reception side, the tuner may receive a DWD. The DWD may include information on a distribution window, through which a second file is delivered. In addition, the DWD may include a second filter code associated with the second file. At this time, the processor may compare the stored filter code with the second filter code in the DWD to determine whether the second file is downloaded or not. Upon determining that the second file is downloaded, the tuner may selectively download the second file through the distribution window indicated by the DWD.

In another embodiment of the method of providing broadcast content at a reception side, the application may use a second API to store the filter code in the reception-side broadcast content provision apparatus. The second API may include a parameter having a second object. The second object may include a pair of a filter code and expiration information indicating the expiration time of the filter code.

In another embodiment of the method of providing broadcast content at a reception side, the first API may be issued by the reception-side broadcast content provision apparatus and may be used to acquire the filter code from the application.

In another embodiment of the method of providing broadcast content at a reception side, the second API may be issued by the application and may be used to set the filter code in the reception-side broadcast content provision apparatus.

A method of providing broadcast content at a transmission side in a transmission-side broadcast content provision apparatus according to the present invention may have the embodiments corresponding to the method of providing the broadcast content at the reception side according to the present invention. The transmission-side broadcast content provision apparatus according to the present invention and the internal components thereof may perform the embodiments corresponding to the method of providing the broadcast content at the reception side according to the present invention.

Modules or units may correspond to processors that execute continuous processes stored in a memory (or a storage unit). The respective steps described in the above-described embodiments may be performed by hardware/processors. The respective modules/blocks/units described in the above embodiments may operate as hardware/processors. In addition, the methods proposed in the present invention may be executed as codes. These codes may be written in a processor-readable storage medium, and thus may be read by a processor provided by an apparatus.

Even though the respective drawings have been separately described for convenience of description, embodiments described in the respective drawings may be merged into a new embodiment. In addition, designing of a computer-readable recording medium in which a program for executing the above-described embodiments according to necessity of a person skilled in the art is within the scope of the present invention.

Referring to the apparatuses and methods according to the present invention, configurations and methods of the embodiments are not restrictively applicable, and all or some of the above-described embodiments may be selectively combined and configured such that the embodiments can be variously changed Meanwhile, the methods proposed in the present invention may be implemented as processor-readable code stored in a processor-readable recording medium included in a network device. The processor-readable recording medium includes all types of recording devices in which processor-readable data is stored. Examples of the processor-readable recording medium include a ROM, a RAM, a CD-ROM, a magnetic tape, a floppy disk, an optical data storage device, etc. In addition, the examples include a carrier-wave type implementation such as a transmission over the Internet. Furthermore, as the processor-readable recording medium is distributed to a computer system connected via a network, processor-readable code can be saved and executed in a distributed manner.

Further, even though preferred embodiments of the present invention have been illustrated and described, the present invention is not restricted to a certain embodiment described above, and various modifications and variations can be made by those skilled in the art without departing from the subject matter of the present invention as defined by the claims. Furthermore, these modified embodiments should not be understood separately from the spirit or scope of the present invention.

Both apparatus and method inventions are mentioned in this specification and descriptions of both the apparatus and method inventions may be complementarily applicable to each other.

It should be understood by those skilled in the art that various changes and modifications can be made in the present invention within the spirit or scope of the present invention. Therefore, the present invention is intended to include changes and modifications of the present invention within the scope of accompanying claims and equivalents thereof.

Both apparatus and method inventions are mentioned in this specification and descriptions of both the apparatus and method inventions may be complementarily applicable to each other.

MODE FOR INVENTION

Various embodiments have been described in best modes.

INDUSTRIAL APPLICABILITY

The present invention is used in a series of broadcast signal provision fields.

It is clear to those skilled in the art that various changes and modifications can be made in the present invention within the spirit or scope of the present invention. Therefore, the present invention is intended to include changes and modifications of the present invention within the scope of accompanying claims and equivalents thereof.

The invention claimed is:

1. A method for providing a broadcast content in an apparatus, the method comprising:
   requesting a filter code to an application running on the apparatus by using a first Application Programming Interface (API), wherein the filter code is an unsigned integer associated with personalization categories as determined by a broadcaster;
   receiving a JavaScript Object Notation (JSON) object from the application in response to the first API, wherein the JSON object includes a pair of the filter code and expiration information indicating an expiry of the filter code;
   storing the filter code;
   receiving an Extended File Delivery Table (EFDT) having a first filter code associated with a first file, wherein the first filter code represents a personalization description for the first file; and
   selectively downloading the first file by comparing the stored filter code with the first filter code in the EFDT.

2. The method of claim 1, the method further comprising:
   receiving a Distribution Window Description (DWD) including information indicating a distribution window during which a second file will be delivered and a second filter code associated with the second file;

determining whether to download the second file by comparing the stored filter code with the second filter code in the DWD; and selectively downloading the second file through the distribution window indicated in the DWD.

3. The method of claim 1, wherein the application uses a second API for the apparatus to store a filter code, wherein the second API includes a parameter having a second object, the second object including a pair of the filter code and expiration information indicating an expiry of the filter code.

4. The method of claim 1, wherein the first API issued by the apparatus is for getting a filter code from the application.

5. The method of claim 3, wherein the second API issued by the application is for setting a filter code in the apparatus.

6. An apparatus for providing a broadcast content, comprising:

a storage;

a processor configured to request a filter code to an application running on the apparatus by using a first Application Programming Interface (API), wherein the filter code is an unsigned integer associated with personalization categories as determined by a broadcaster, wherein the processor is further configured to receive a JavaScript Object Notation (JSON) object from the application in response to the first API, wherein the JSON object includes a pair of the filter code and expiration information indicating an expiry of the filter code, wherein the processor is further configured to store the filter code in the storage; and a tuner configured to receive an Extended File Delivery Table (EFDT) having a first filter code associated with a first file, wherein the first filter code represents a personalization description for the first file, wherein the tuner is further configured to selectively download the first file by comparing the stored filter code with the first filter code in the EFDT.

7. The apparatus of claim 6, wherein the tuner is further configured to receive a Distribution Window Description (DWD) including information indicating a distribution window during which a second file will be delivered and a second filter code associated with the second file, wherein the processor is further configured to determine whether to download the second file by comparing the stored filter code with the second filter code in the DWD, and wherein the tuner is further configured to selectively download the second file through the distribution window indicated in the DWD.

8. The apparatus of claim 6, wherein the application uses a second API for the apparatus to store a filter code, wherein the second API includes a parameter having a second object, the second object including a pair of the filter code and expiration information indicating an expiry of the filter code.

9. The apparatus of claim 6, wherein the first API issued by the apparatus is for getting a filter code from the application.

10. The apparatus of claim 8, wherein the second API issued by the application is for setting a filter code in the apparatus.

* * * * *